United States Patent [19]
Bacher

[11] Patent Number: 5,149,010
[45] Date of Patent: Sep. 22, 1992

[54] TWO-PART FRONT COVER FOR SPINCAST REELS

[75] Inventor: Bruce E. Bacher, Broken Arrow, Okla.

[73] Assignee: Zebco Corporation, Tulsa, Okla.

[21] Appl. No.: 698,331

[22] Filed: May 6, 1991

Related U.S. Application Data

[63] Continuation of Ser. No. 462,451, Jan. 9, 1990, abandoned.

[51] Int. Cl.$^5$ .............................................. A01K 89/01
[52] U.S. Cl. .................................. 242/311; 242/224; 242/312; D22/141
[58] Field of Search ............... 242/311, 223, 224, 312, 242/313, 314, 310, 319; D22/141

[56] References Cited

U.S. PATENT DOCUMENTS

| | | | |
|---|---|---|---|
| D. 262,483 | 12/1981 | Miller | D22/25 |
| D. 272,174 | 1/1984 | Hull | D22/25 |
| 3,152,771 | 10/1964 | Maury et al. | 242/311 X |
| 3,381,914 | 5/1968 | Taggart | 242/311 X |
| 3,614,015 | 10/1971 | Sussman | 242/312 |
| 3,970,263 | 7/1976 | Hull | 242/311 |
| 4,130,251 | 12/1978 | Findly | 242/311 X |
| 4,195,793 | 4/1980 | Stiner | 242/311 |
| 4,331,303 | 5/1982 | Moss | 242/311 |
| 4,359,196 | 11/1982 | Puryear | 242/311 |
| 4,386,742 | 6/1983 | Moss et al. | 242/311 |
| 4,390,140 | 6/1983 | Karlsson et al. | 242/312 X |

FOREIGN PATENT DOCUMENTS 1163258  3/1984  Canada .............................. 242/311

*Primary Examiner*—Stuart S. Levy
*Assistant Examiner*—Joseph A. Rhoa
*Attorney, Agent, or Firm*—Wood, Phillips, Van Santen, Hoffman & Ertel

[57] ABSTRACT

A fishing reel of the spincast type has a suitable internal mechanism carried within an improved housing including a front cover, a rear cover and a stem and mounting foot thereon for mounting to a fishing rod. The front cover has two parts, the first part (11a) being cylindrical with a front and rear edge and the second part (11b) having a conical forward portion and a cylindrical rearward portion. The front edge portion of the first part has two cylindrical flanges forming an annular groove (58) therebetween. The inner of the flanges has spaced apart cutouts (60) therein. The front edge portion of the inner of the flanges has at least one notch (64) in alignment with one of the cutouts contained therein. The rearward end of the second part is receivable in rotational alignment within the annular groove of the first part and further has tabs (50) around its interior with at least one of said tabs being aligned with the at least one notch, whereupon when the two parts are pushed axially relative to each other, the tabs will seat in the cutouts, thereby locking the first and second parts together.

4 Claims, 1 Drawing Sheet

TWO-PART FRONT COVER FOR SPINCAST REELS

This application is a continuation of application Ser. No. 402,451, filed Jan. 9, 1990, now abandoned.

TECHNICAL FIELD

This invention relates to a housing for a fishing reel and, more particularly, to a two-part front cover for the housing.

BACKGROUND ART

Fishing reels in the prior art have included generally front and rear covers which are connected together to house the internal mechanism of the reel. Distinct advantages may be obtained by making a portion of the front cover out of plastic and another portion of the front cover out of metal, although both parts have been made of metal or of plastic. As shown in Moss U.S. Pat. No. 4,331,303, while it is possible to use the advantageous features of using two different materials, assembly difficultuies may arise in aligning each portion of a two-part front cover.

DISCLOSURE OF THE INVENTION

A fishing reel is disclosed which is of the spincast type having a suitable internal mechanism carried within an improved housing including a front cover and a rear cover. A stem and mounting foot are provided for mounting the reel to a fishing rod. The front cover has two parts, the first part being cylindrical with a front edge portion and a rear edge portion, and the second part having a conical forward portion and a cylindrical rearward portion. The front edge portion of the first part has two cylindrical flanges forming an annular groove therebetween. The inner flange of the two flanges has at least two spaced-apart cutouts therein. The front edge portion of the inner of the flanges has at least one U-shaped notch formed therein in alignment with at least one of the cutouts contained therein. A ramped linear groove connects the U-shaped notch with the aligned cutout. The rearward end portion of the second part is receivable in rotational alignment within the annular groove of the first part and further has tabs around its interior. One of said tabs is aligned with the notch, whereupon pushing the rearward edge of the second part into the groove in the first part will cause the tabs to project into the cutouts when the second part is fully received in the groove. Once the tabs spring into the cutouts, abutment of the tabs with the cutout walls prevents the first and second parts from being pulled apart.

The disclosed two-part front cover may be easily manufactured and assembled taking advantage of the characteristics of the selected materials for the respective parts. The first part may be made of a suitable plastic material while the second part may be made of a suitable metal such as aluminum. Because the two parts are virtually impossible to pull apart once snapped together, it is desirable to ensure that the parts are joined in proper alignment. The U-shaped notch allows the mating tabs of the second part to be accurately aligned with the cutouts prior to permanent joinder of the two parts. The linear grooves enforce the continuous alignment of the mating tabs with the cutouts while the parts are snapped together. Since the rearward end of the second part is within an annular groove, it is prevented from spreading when the two parts are pressured apart, thereby preventing the tabs from slipping out of the cutouts and, of course, thereby preventing the two parts from being separated.

BEST MODE FOR CARRYING OUT THE INVENTION

Figure 1:
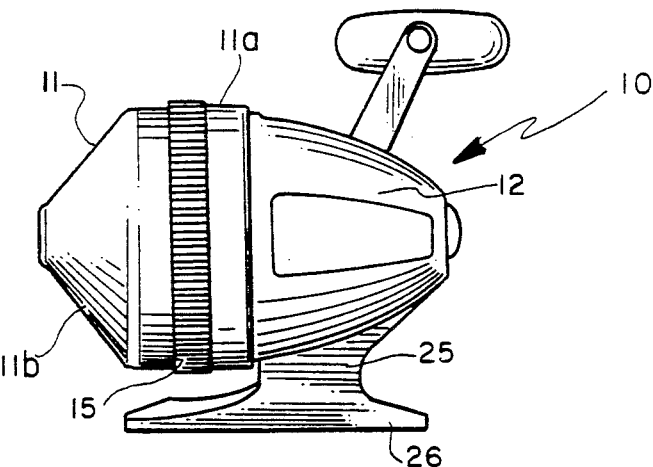
FIG. 1 is a side view of a spincast fishing reel incorporating the invention.
Figure 2:
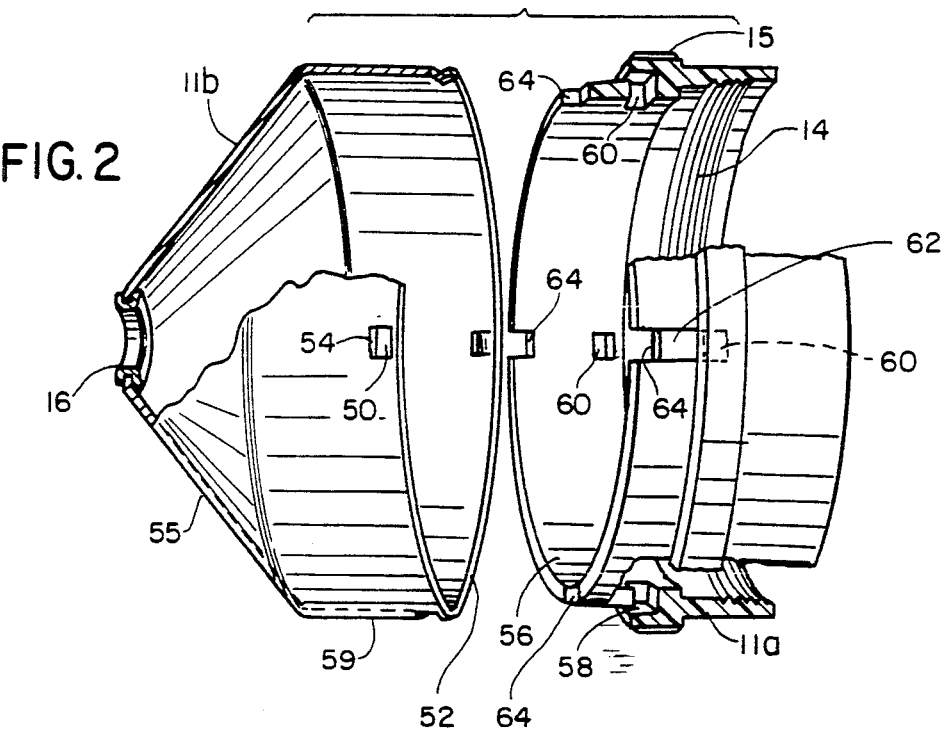
FIG. 2 is an exploded view of a front cover including each part of the invention.

Referring first to FIG. 1, there is shown a reel, including a closed face housing 10, having a two-part front cup-shaped cover 11 and a rear cup-shaped cover 12. The front cover 11 has a ring or cylindrically-shaped first part 11a and a cone-shaped second part 11b. The ring or cylindrically-shaped first part 11a of the front cover 11 may be molded from a high impact strength plastic, such as ABS. The cone-shaped second part 11b of the front cover 11 may formed of a metal, such as aluminum. The rear cover 12 may be formed of a platable grade ABS with a nickel or chrome plating (FIG. 2). The cone-shaped second part 11b has a generally annular rearward edge portion 52 engaging in a forwardly facing locking groove 58 formed on the second part 11b of the cover 11. The cone-shaped second part 11b has means for rigidly locking the second part 11b to the first part 11a. The cone-shaped second part 11b of the cover 11 has a conical front portion 55 including a circular line opening which mounts an annular line guide 16 in a known manner. The cylindrical first part 11a of the front cover 11 has helical threads 14 formed on the rearmost internal surface thereof and has knurled gripping portions 15 formed on the external surface thereof.

The rear cover 12 has an integrally molded, radially extending stem 25 with a mounting foot 26 on the outer end thereof for attachment to the appropriate part of a fishing rod. The mounting foot 26 is to be attached to the upper surface of a fishing rod for use. The front cover containing the invention can be used below the rod-type reels (see U.S. Pat. No. Des.262,483), as well as with other styles of reels, for instance, a reel of the type shown in U.S. Pat. No. Des.272,174, where the front cover attaches to a body of the reel instead of to the rear cover.

Figure 3:
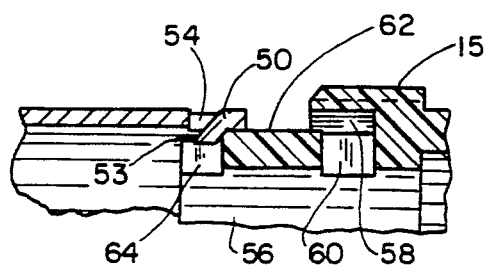
FIG. 3 is a sectinal view of each part of the invention just prior to assembly.
Figure 4:
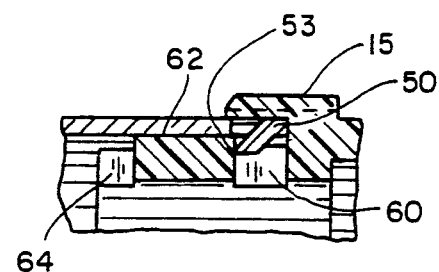
FIG. 4 is a sectional view of each part of the invention as completely assembled.

The structure for attaching the cylindrically-shaped first part 11a and the cone-shaped second part 11b of the front cover 11 is shown in FIGS. 2-4. The cone-shaped second part 11b has the conical forward portion 55 and a cylindrical rearward portion 59, tabs 50, four are shown in the drawings, are struck inwardly at spaced-part locations around the rear edge portion 52 of the cone-shaped second part 11b. It is to be understood that only two substantially diametrically opposite tabs 50 are all that are needed, but additional ones like the four that are shown give a stable positive connection. The tabs 50 are on the inner surface of the second part 11b leaving indentations 54 on the outer surface thereof. The structure of each tab 50 is relatively simple to form in the material of the second part 11b and, due to the structure and material, each tab 50 is readily distorted when assembling the two parts 11a and 11b of the front cover together, as will appear in more detail below.

The cylindrically-shaped first part 11a has a cylindrical front portion 56 having an outer diameter substantially equal to the inner diameter at the rear edge portion 52 of the cone-shaped second part 11b, thereby permitting the two part 11a, 11b to mate together. The gripping portions 15 form an annular flange around the midsection of the first part 11a, with a portion thereof overlapping the rear part of the cyldinrical front portion. The space between the gripping portion 15 and the cylindrical front portion 56 defines an annular groove 58 therebetween.

Formed in the rearward part of the cylindrical front portion 56 at spaced-apart locations are cutouts 60 which are intended to be aligned with the tabs 50 of the second part 11b. The cutouts 60 are substantially covered by the overlapping portion of the gripping portion 15. Also formed in the forwardmost edge of the cylindrical front portion 56 is at least one U-shaped notch 64 in circumferential alignment with the cutouts 60.

A ramped portion 62 is provided with each corresponding pair of cutouts 60 and notches 64. In the illustrated embodiment, there is a notch 64 aligned with each cutout. In practice, as few as only one notch 64 is all that is needed. That is, with the rear edge portion 52 of the cylindrical portion 59 telescoping over the forward part of cylindrical front portion 56, aligning one tab 50 with one notch 64 will automatically align the rest of the tabs 50 with the mating cutouts 60. The U-shaped notches 64 and ramped portions 62 facilitate the mating of the first and second parts 11a, 11b by both indicating the locations of the cutouts 60 (which are somewhat hidden beneath the gripping portions 15) and by easing the movement of the tabs 50 over the cylindrical front portion 56 of the first part 11a. The ramped portions 62 further facilitate mating of the first and second parts 11a,11b by establishing a circumferential detent position which aids in maintaining the alignment of the first and second parts 11a,11b during the mating process.

A secure mating of the first and second parts 11a, 11b is provided when the two parts are pushed together, as shown in FIG. 4. As the rearward portion 59 of the second part 11b is pushed over the front portion 56 of the first part 11a, the tabs 50 are distorted and gradually pushed outward by the ramp portions 62. Once the two parts 11a, 11b are pushed together fully, the rear edge portion 52 of the second part 11b fits snugly in the annular groove 58 and the tabs 50 spring back inwardly into the cutouts 60. In this position, as shown in FIG. 4, the forwardly facing surfaces 53 of the tabs 50 abut the forward side of the cutouts 60 so that it will be virtually impossible to pull the two parts 11a, 11b apart. In addition, the gripping portion 15 encircles the rear edge portion 52 of the second part 11b, including the tabs 50, preventing the rear edge portion 52 from spreading and thereby maintaining the tabs 50 in the cutouts 60.

Other aspects, objects and advantages of this invention will become apparent from an examination of the specification, drawings, and appended claims.

I claim:

1. In a spincast-type fishing reel having a reel axis and an internal mechanism carried within an improved housing, comprising:

a rear cover;

means on the housing for mounting the reel to a fishing rod;

a front cover having an axis and a first part with a cylindrical portion with a front and rear edge, said front edge including two cylindrical concentric axially directed flanges forming an annular groove therebetween, one of said flanges having first and second circumferentially spaced apart cutouts therein;

means for securing said rear edge of said first part to the rear cover; and said front cover having a second part, said second part including a conical forward portion a cylindrical rearward portion, said rearward portion having a rear edge, said rearward portion being receivable within said annular groove of said first part and having spaced-apart deflectable tabs struck directly from the cylindrical rearward portion at a location spaced forwardly of the rear edge of the second part of the front cover, said tabs each projecting in cantilever fashion radially inwardly from the cylindrical rearward portion of the second part of the front cover, said tabs being receivable one each within said first and second cutouts when said rearward cylindrical portion is fully seated in said annular groove, there being first cooperating means on the spaced apart tabs and second front cover part for preventing said first and second parts from being pulled apart with the first and second front cover parts in locked operative relationship, wherein the cooperating means are integrally formed on the first and second parts for keying the first and second parts against relative rotation about the axis with the first and second parts in a first predetermined relative rotational position with the tabs spaced axially from the annular groove and for guiding the tabs into the first and second cutouts to place the first and second front cover parts in locked operative relationship upon the first and second parts being aligned in said first predetermined relative rotational position and moved in a straight line axially towards each other, said cooperating means including at least a notch on the forwardmost edge of the first cover part extending radially completely through the first cover part for reception of at least one of the tabs to receive the one tab and thereby align the first and second front cover parts in said first relative rotational position about the axis to thereby allow guided axial movement of the one tab into one of the first and second cutouts, wherein the notch is aligned with one of said first and second cutouts, said notch being U-shaped opening in a forward axial direction and bounded by a forwardly facing edge so that there is an unimpeded path defined from forwardly of the first cover part to said forwardly facing edge, said cooperating means including a radially undercut ramp surface in the first front cover part extending axially substantially the entire distance from the forwardly facing edge bounding the notch to one of the first and second cutouts, whereby by placing the first and second front cover parts in an axially overlapping relationship, one within the other in said first relative rotational position, wherein one of the tabs is in said notch, the first and second front cover parts can be placed in their locked operative relationship simply by moving the first and second front cover parts axially, one against the other, which causes the one tab to bear against the ramp surface so as to be deflected thereby radially outwardly until the one tab aligns with one of the first and second cutouts whereupon the one tab springs back into the one of the first and second cutouts so that the first cooperating means maintains the first and second front cover parts in said locked operative relationship.

2. The spincast-type reel according to claim 1 wherein there are a plurality of tabs cooperating with a like plurality of notches and ramp surfaces, that cooperate with each other functionally in the same manner as the one tab, the notch, the claimed ramp surface and said one of the first and second cutouts.

3. The spincast-type reel according to claim 1 wherein the first cooperating means comprises confronting shoulders on the one tab and the first front cover part.

4. The spincast-type reel according to claim 1 wherein the ramp surface radially inclines in an axial direction from front to rear on the first front cover part.

* * * * *